(12) United States Patent
Malina et al.

(10) Patent No.: US 9,732,948 B1
(45) Date of Patent: *Aug. 15, 2017

(54) HANDS-FREE LED LIGHTING SYSTEM

(71) Applicants: David Malina, Santa Barbara, CA (US); Emma Hamilton Malina, Santa Barbara, CA (US)

(72) Inventors: David Malina, Santa Barbara, CA (US); Emma Hamilton Malina, Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/243,733

(22) Filed: Aug. 22, 2016

Related U.S. Application Data (63) Continuation of application No. 14/713,614, filed on May 15, 2015, now Pat. No. 9,423,114.

(60) Provisional application No. 62/001,985, filed on May 22, 2014.

(51) Int. Cl.
| | |
|---|---|
| *F21V 21/096* | (2006.01) |
| *F21V 23/04* | (2006.01) |
| *F21V 31/00* | (2006.01) |
| *F21L 4/02* | (2006.01) |
| *F21L 4/08* | (2006.01) |
| *H02J 7/02* | (2016.01) |
| *F21V 23/06* | (2006.01) |
| *H02J 7/00* | (2006.01) |
| *F21Y 115/10* | (2016.01) |

(52) U.S. Cl.
CPC ............ *F21V 21/0965* (2013.01); *F21L 4/02* (2013.01); *F21L 4/085* (2013.01); *F21V 23/04* (2013.01); *F21V 23/0471* (2013.01); *F21V 23/06* (2013.01); *F21V 31/00* (2013.01); *H02J 7/0047* (2013.01); *H02J 7/025* (2013.01); *F21Y 2115/10* (2016.08); *H02J 2007/0049* (2013.01)

(58) Field of Classification Search
CPC ...... F21V 21/09; F21V 23/04; F21V 23/0471; F21V 23/06; F21V 31/00; F21L 4/02; F21L 4/085; H02J 7/0047; H02J 7/025
See application file for complete search history.

(56) References Cited

U.S. PATENT DOCUMENTS

| | | |
|---|---|---|
| 5,738,432 A | 4/1998 | Okko et al. |
| 6,461,015 B1 | 10/2002 | Welch |
| 6,925,656 B2 | 8/2005 | Henderson |
| 6,964,493 B1 | 11/2005 | Whitlock |
| 7,611,255 B1 | 11/2009 | Lagassey |
| 7,699,485 B1 | 4/2010 | Lagassey |
| 7,866,066 B2 | 1/2011 | Forbes |
| 8,025,432 B2 | 9/2011 | Wainright |

(Continued)

*Primary Examiner* — Mary Ellen Bowman
(74) *Attorney, Agent, or Firm* — Knobbe, Martens, Olson & Bear LLP (57) ABSTRACT

A light system is provided that can be removably coupled to a layer of material, such as clothing, to provide hands-free illumination for tasks and activities (e.g., while walking, running, reading, writing) at low level light conditions. The light system includes a light module with one or more light sources, a power source and one or more magnetic elements or magnetically responsive modules. The light system also includes a backing plate removably coupleable to the light module so that the layer of material is interposed between the light module and the backing plate. The backing plate has one or more magnetic elements or magnetically responsive modules. When removably coupled to said layer of material, the light module and backing plate remain substantially in place even when the layer of material is under motion.

20 Claims, 10 Drawing Sheets

(56) References Cited

U.S. PATENT DOCUMENTS

| | | |
|---|---|---|
| 8,708,513 B2 | 4/2014 | Schrimmer |
| 8,783,891 B2 | 7/2014 | Schrimmer |
| 2003/0231489 A1 | 12/2003 | Hsiao |
| 2011/0025195 A1 | 2/2011 | Govender |
| 2012/0212968 A1 | 8/2012 | Brown |
| 2013/0265788 A1 | 10/2013 | O'Maley et al. |
| 2014/0063790 A1 | 3/2014 | Gold |

HANDS-FREE LED LIGHTING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This invention relates to the field of portable lighting systems. More specifically, the invention comprises a lighting system that provides hands-free illumination for activities in low level light conditions, e.g. at night.

Description of the Related Art

There are many known devices that attach to a person that provide illumination for activities in low level light conditions. Generally, they fall into 2 categories:

A) Lighting systems that allow the user to safely conduct their activities by illuminating their field of vision. These systems are usually lights that the person is holding in their hands or attach to the person's body or garments via straps and/or clips.

B) Devices that alert another person(s) approaching the first person of their presence. This is done usually through flashing and/or constant illumination of a light source, most commonly of a RED colored light for maximum distance visibility with the purpose of avoiding being struck by a vehicle.

Of the lighting systems in Category A that provide hands-free illumination, the most popular systems attach to the user's head via straps, or attach to a bill of a hat. Both of these options are less than desirable as one may not want to have to wear anything on their head when pursuing certain activities. They also require the lighting system to be mounted close to the person's eyes, resulting in the adverse effect of blinding the user. Additionally, these systems move with the head, so when a user looks up at an approaching vehicle, there's a potential of temporarily blinding the oncoming driver.

SUMMARY

An LED light system that is removably coupleable to a layer of material (e.g., running apparel, hiking apparel, tents, bags) or other components to provide hands-free illumination (e.g., while walking, running, reading) at low level light conditions.

The system is comprised of two separate housings, an LED light module and a backing plate. The backing plate contains a magnetic element and removably couples to a magnetic element in the LED light assembly, whereby the material layer can be sandwiched between the backing plate and the light module, thus mounting the LED light system on any position where a layer of material is present.

This allows for hands-free illumination of a desired area which is the focus of an activity or a task.

By freely being able to place the light on different areas of the user's garment, the illuminated area can be changed seamlessly. The advantage of this configuration is that the person's hands are free to pursue activities, and that it is not necessary to use straps or clips that limit the available positions for mounting, or mandating the use of additional garments and accessories (e.g. hats, glasses, helmets) that may not be desired for the chosen activity.

The light emitted by the LED light system is directed downwards at an angle, thus avoiding shining in the user's or approaching persons' eyes.

In accordance with one embodiment, a light system is provided that is removably coupleable to a layer of material to provide hands-free illumination at low level light conditions. The light system comprises a light module comprising one or more light sources, a power source and one or more magnetic elements or magnetically responsive modules. The light system also comprises a backing plate removably coupleable to the light module so that the layer of material is interposed between the light module and the backing plate, the backing plate comprising one or more magnetic elements or magnetically responsive modules. When removably coupled to said layer of material, the light module and backing plate remain substantially in place even when the layer of material is under motion.

In accordance with another embodiment, a light system is provided that is removably coupleable to a layer of material to provide hands-free illumination at low level light conditions. The light system comprises a light module comprising one or more light sources, a power source and one or more magnetic elements or magnetically responsive modules. The light system also comprises a backing plate removably coupleable to the light module so that the layer of material is interposed between the light module and the backing plate, the backing plate comprising one or more magnetic elements or magnetically responsive modules. The one or more light sources are operable to provide one or both of: a lower intensity, but wider dispersed ambient light to illuminate the peripheral vision and to help alert potential approaching persons and vehicles by illuminating a wider range of the environment; and a higher intensity, more focused task light helping to illuminate an area from the person's feet to about 6-10 feet ahead, if the light is mounted centered on the person's chest. When removably coupled to said layer of material, the light module and backing plate remain substantially in place even when the layer of material is under motion.

DETAILED DESCRIPTION

FIGS. 1A-3 show one embodiment of the LED light module 200. The LED light module 200 can include a front housing 210; an Power On/Off Button 211; an optic 220; a mask sheet 230; an LED driver printed circuit board (PCB) 240; one or more lighting elements, such as an LED 241; a charging and data transfer interface 242, such as a micro USB connector; a power source 250; a magnetically responsive element 260, such as a Neodymium N52 Disk; and a rear housing 270.

The front housing 210 can have an opening to receive an optic 220, which in one embodiment can be a clear covering with optically enhanced lens portions 221 which can optimize the light emitted by the light source 241. In one embodiment, the front housing 210 can have a Power Switch 211. In one embodiment, Power Switch 211 can be a mechanical interface. In another embodiment the Power Switch 211 can be connected to the optic 220, where by pressing on the optic 220, the Power Switch 211 is activated. In another embodiment, the Power Switch 211 can be activated wirelessly via an application on a smart phone or tablet. In another embodiment, the Power Switch 211 can be triggered by a photo detector. In another embodiment, the Power Switch 211 can be activated by a motion sensor.

Figure 1A:
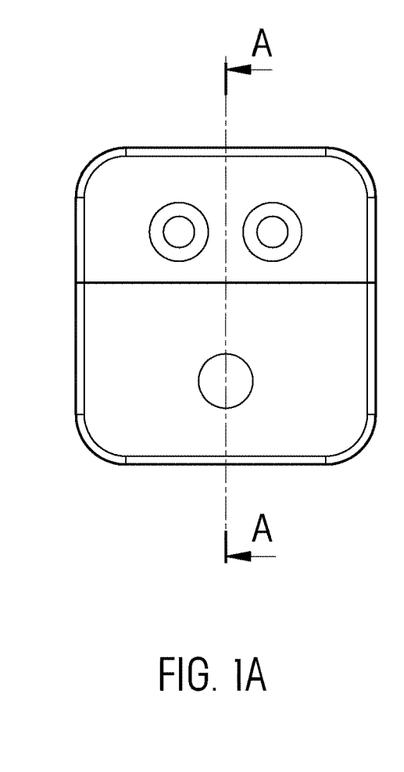
FIG. 1A is a schematic front plan view of the light module
Figure 1B:
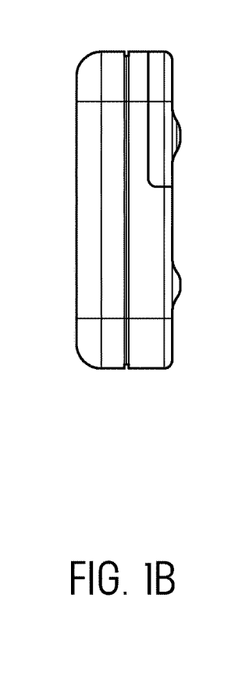
FIG. 1B is a schematic side plan view of the light module
Figure 1C:
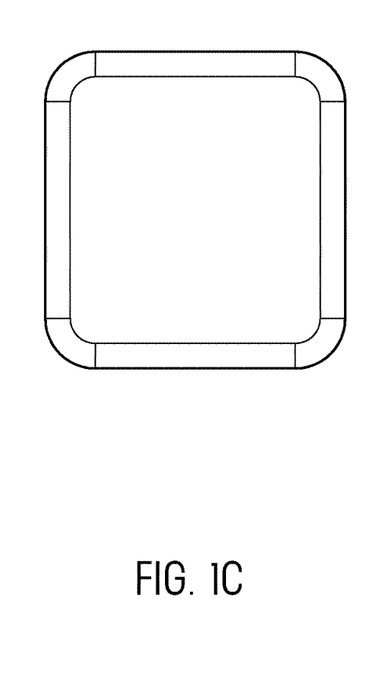
FIG. 1C is a schematic rear plan view of the light module
Figure 1D:
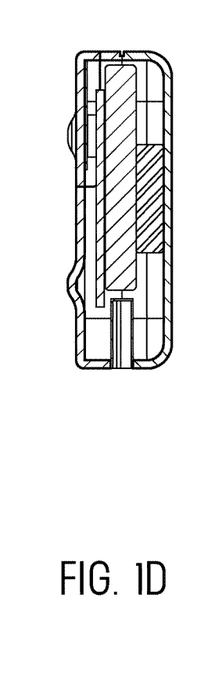
FIG. 1D is a schematic cross-sectional view of the assembled light module
Figure 2A:
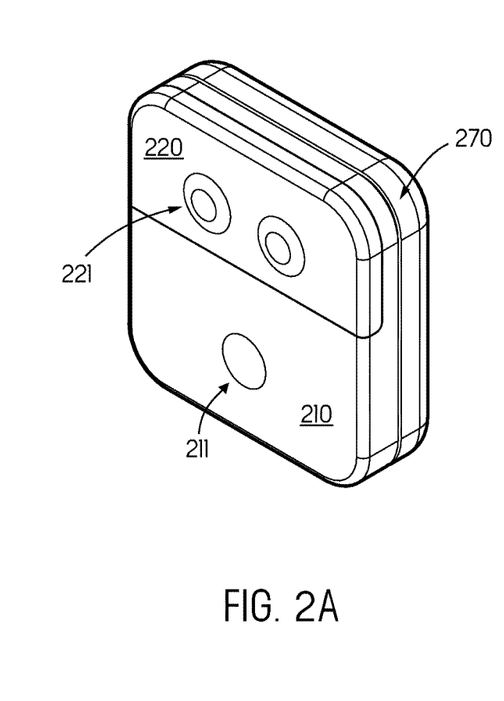
FIG. 2A is a schematic perspective front view of the light module
Figure 2B:
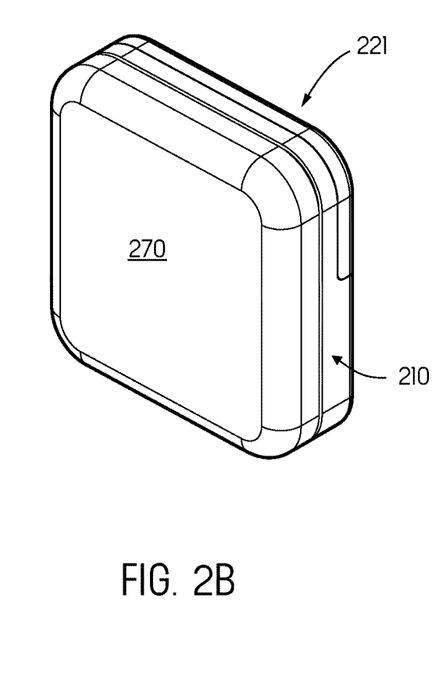
FIG. 2B is a schematic perspective rear view of the light module
Figure 2C:
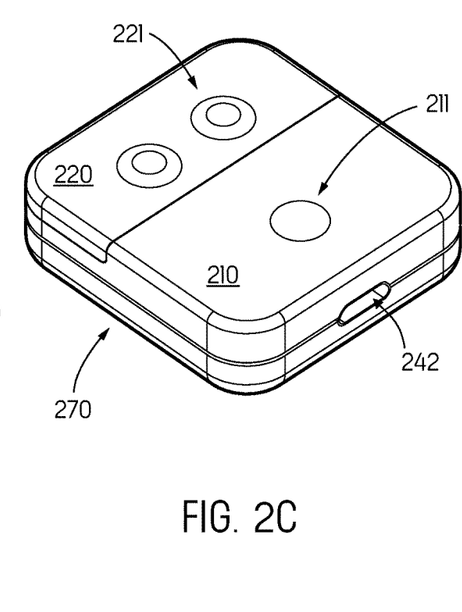
FIG. 2C is a schematic perspective top view of the light module
Figure 3:
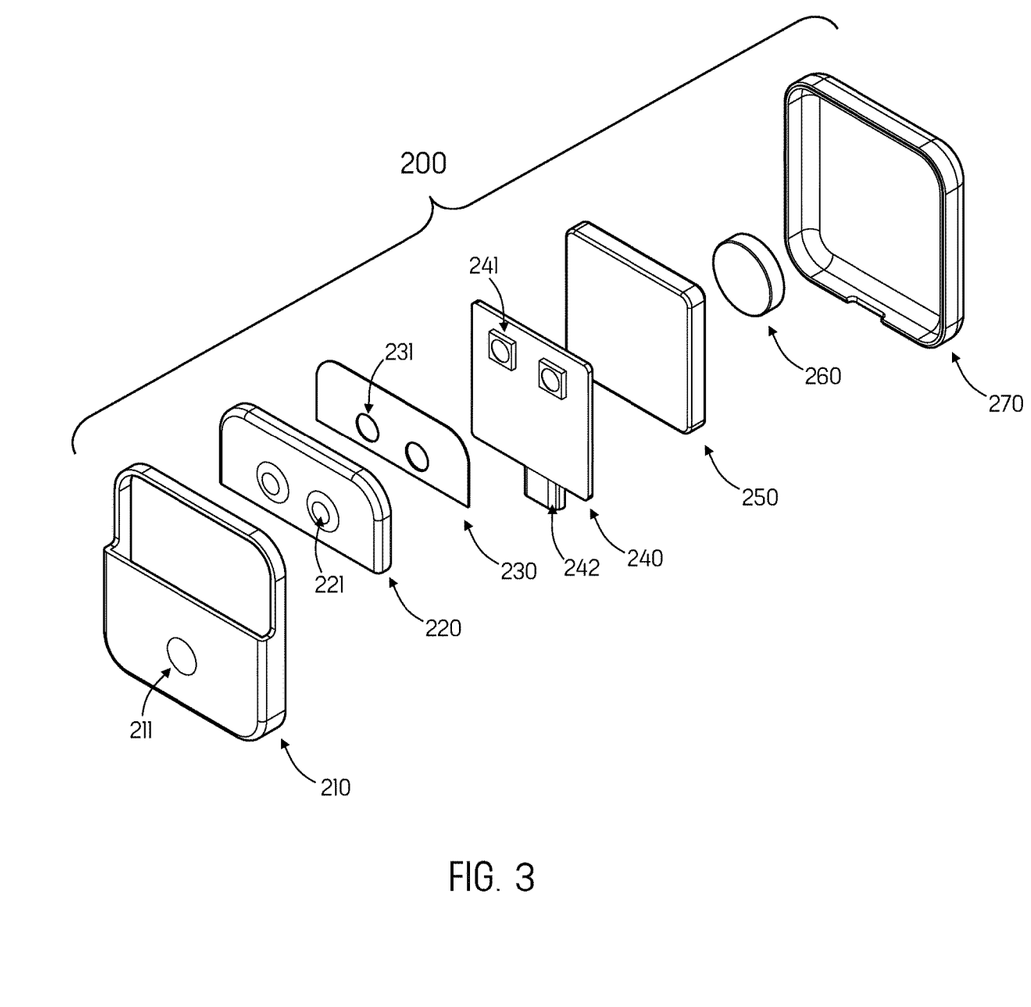
FIG. 3 is a schematic exploded view of the light module assembly

In one embodiment, the light module 200 can contain a mask layer 230 of a light fast material, such as a polymer with one or more apertures 231 to allow for the light to penetrate through the mask layer in at least one specified location. Such layer can, in one embodiment, be spatially affixed to the optic 220.

In one embodiment, the PCB 240 can have one or more light sources, such an 5050 SMT LED; it can have a charging interface such as a Micro USB module 242.

In one embodiment, the light module 200 can also contain a power source 250, such as a rechargeable Lithium Polymer Battery. This power source 250 can be electrically connected to the PCB 240 and can be recharged by connecting an external cable to the Micro USB module 242.

In one embodiment, the PCB 240 can also contain indicator LEDs that indicate status of the power source while charging and/or when the power source is fully charged.

In another embodiment, the light module 200 can contain a wireless induction charging module, and or a charging module with an interface protruding through the housing of the light module.

In another embodiment, the light module 200 can also contain a data transfer module, and/or a Global Positioning System (GPS) module, and/or a motion sensing module, and/or an altitude sensing module, and/or a module to emit a distress signal (e.g., an audible alarm, a personal locator beacon signal).

In one embodiment, the light module can contain a magnetically responsive element 260, such as a Neodymium Disk with a pull force of at least about 4 lbs., in another embodiment a pull force of at least about 6 lbs., in still another embodiment a pull force of at least about 8 lbs (i.e., a pull force of 8 lbs.), and in another embodiment a pull force of at least about 10 lbs, and still in another embodiment a pull force of at least about 12 lbs.

In one embodiment, the front housing 210 and back housing 270 can contain features such as reinforcement walls and bosses to help locate and affix internal components and to help in attaching the front housing 210 to the back housing 270.

In one embodiment, the light module 200 can be assembled in a fashion where it provides a water resistant module. This could be achieved with including an gasket feature at the seams where the housing parts come together. In another embodiment, forming the front housing 210 and back housing 270 with two or more materials of varying durometer. In another embodiment, the internal components can be treated with a coating to provide water resistance.

Figure 4A:
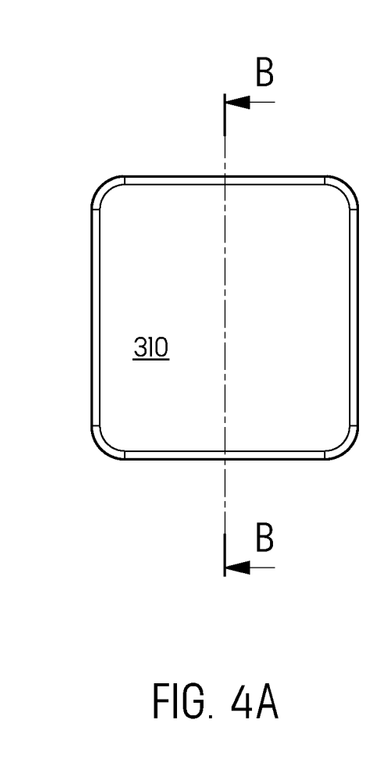
FIG. 4A is a schematic front plan view of the backing plate
Figure 4B:
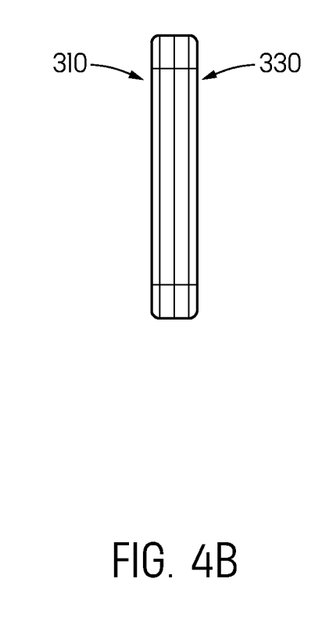
FIG. 4B is a schematic side plan view of the backing plate
Figure 4C:
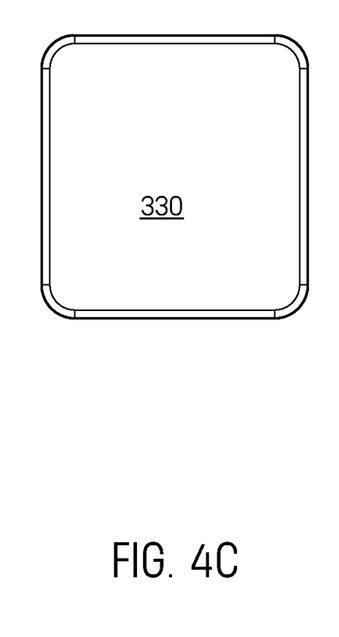
FIG. 4C is a schematic rear plan view of the backing plate
Figure 4D:
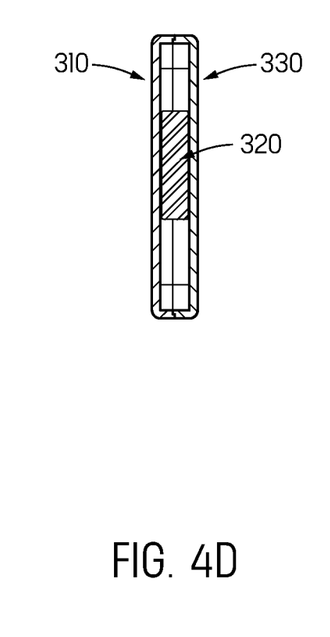
FIG. 4D is a schematic cross-sectional view of the assembled backing plate
Figure 5:
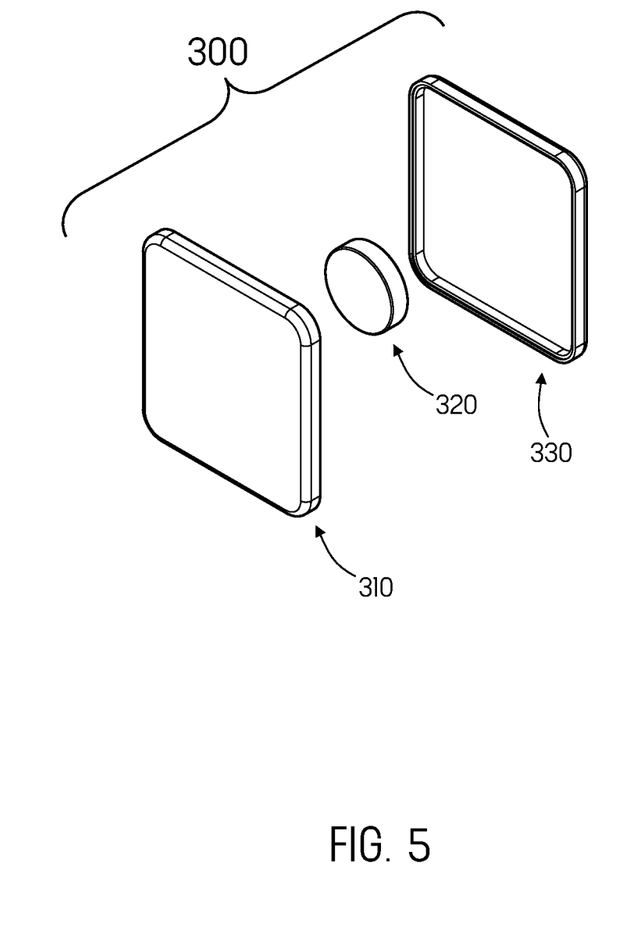
FIG. 5 is a schematic exploded view of the backing plate assembly

FIGS. 4A-5 show one embodiment of the back plate 300. The back plate 300 can contain at least one magnetically responsive element 320, such as a N52 Neodymium Disk with a pull force of at least about 4 lbs., at least about 6 lbs., or at least about 8 lbs; a front housing 310; a back housing 330. In another embodiment, one or both housing modules 310 and 330 can be omitted.

The front housing 310 and back housing 330 can contain features such as reinforcement walls and bosses to help locate and affix internal components and to help in attaching the front housing 310 to the back housing 330. In one embodiment, the magnetically responsive element 320 can be fully enclosed. In another embodiment, the magnetic element can protrude through an orifice in the front housing 310 and/or back housing 330.

Figure 6A:
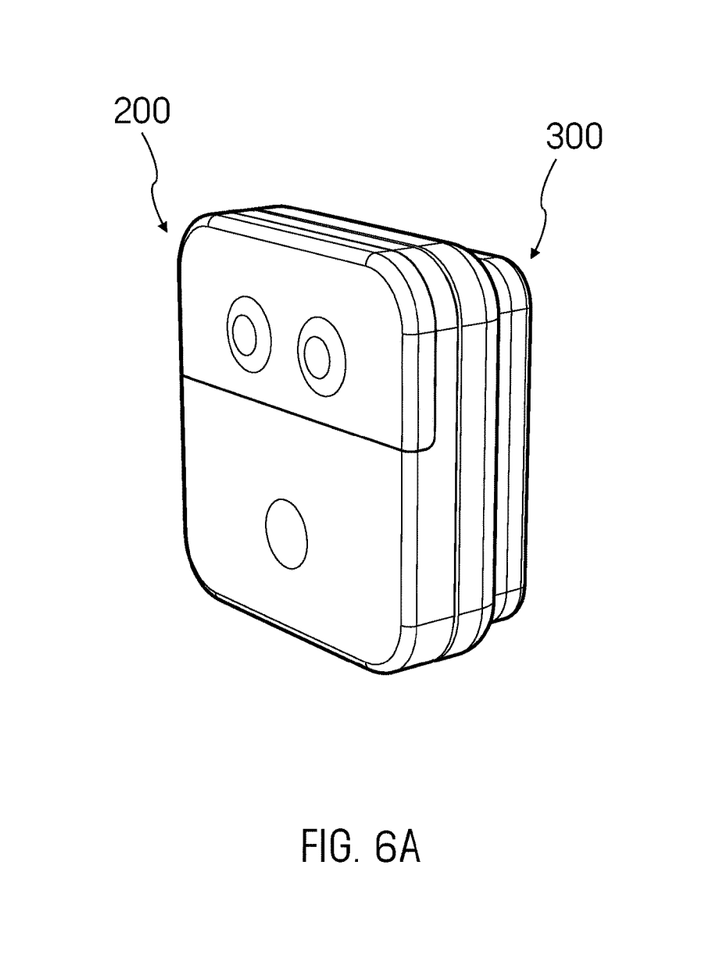
FIG. 6A is a schematic perspective front view of one embodiment of an LED light module with a backing plate magnetically attached to each another
Figure 6B:
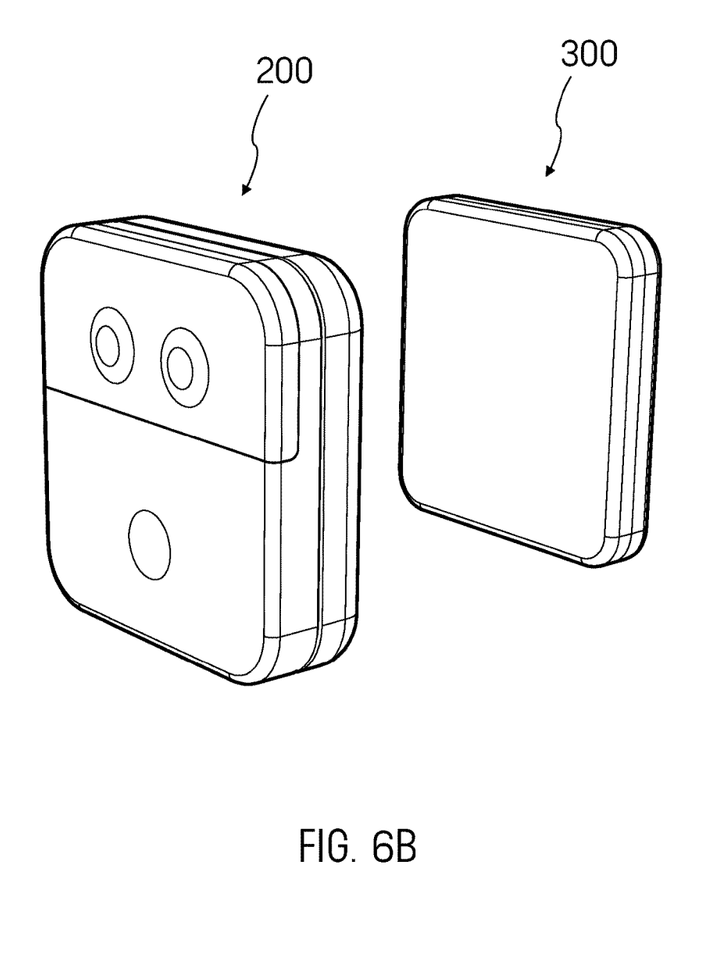
FIG. 6B is a schematic perspective front view of one embodiment of an LED light module (200) with a backing plate (300) shown apart from each another
Figure 7A:
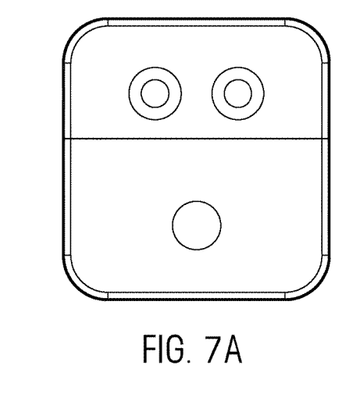
FIG. 7A is a schematic front plan view of the light module and backing plate
Figure 7B:
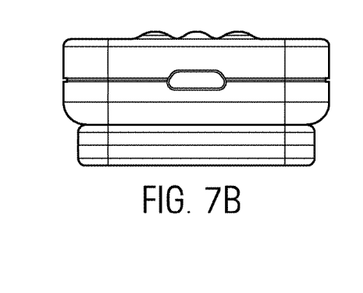
FIG. 7B is a schematic bottom plan view of the light module and backing plate
Figure 7C:
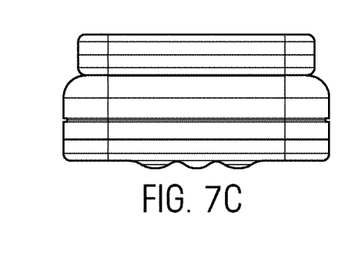
FIG. 7C is a schematic top plan view of the light module and backing plate
Figure 7D:
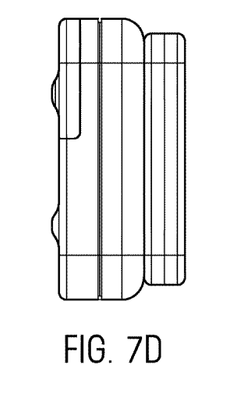
FIG. 7D is a schematic side plan view of the light module and backing plate
Figure 7E:
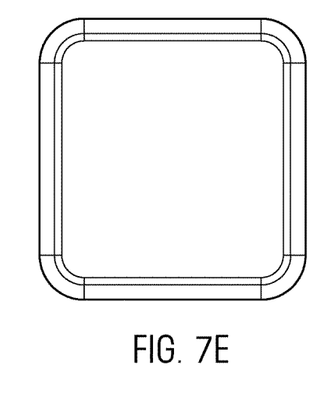
FIG. 7E is a schematic rear plan view of the light module and backing plate

FIGS. 6A-6B show one embodiment of the light module 200 and the backing plate 300. They are held together by magnetic force but can be pulled apart with sufficient force. By spatially aligning the magnetically responsive modules, the light module 200 and back plate 300 can align in a similar fashion every time they are coupled.

FIGS. 7A-7E show schematic views of one embodiment of the LED light system.

Figure 8A:
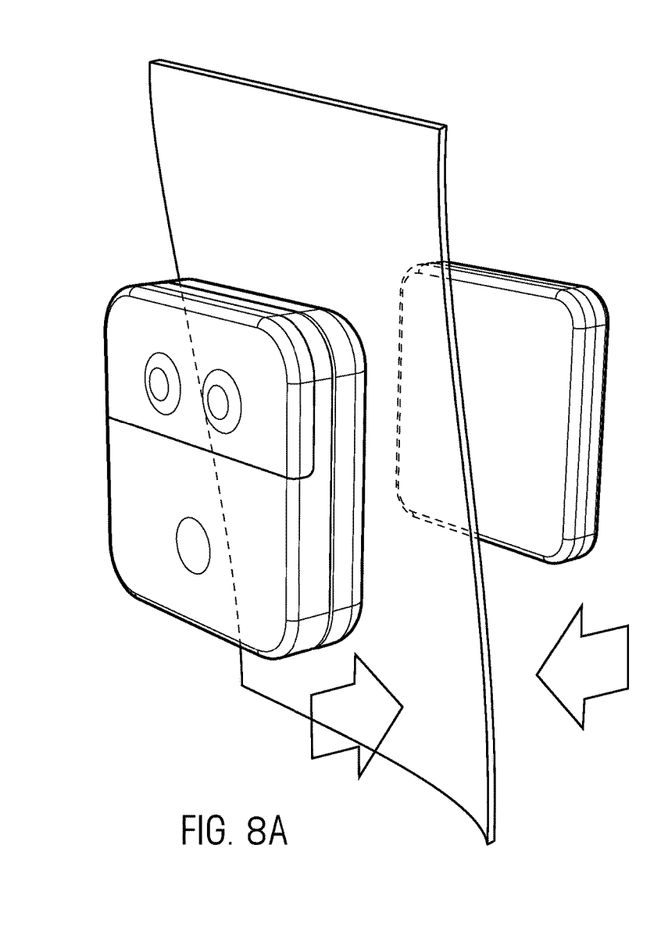
FIG. 8A is a schematic perspective front view of the light module and backing plate removably coupling to a layer of material
Figure 8B:
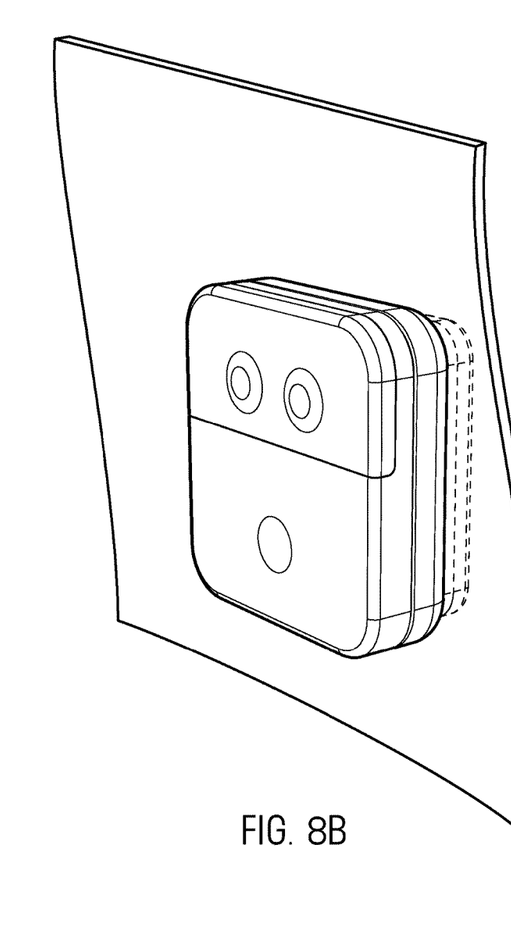
FIG. 8B is a schematic perspective front view of the light module and backing plate removably coupled to a layer of material

FIGS. 8A-8B show schematic views of one embodiment of the light module 200 and backing plate 300. FIG. 8A shows how, by aligning the light module 200 and back plate 300, a layer of material (e.g., running shirt, tent, bag) can be sandwiched. The magnetically responsive modules engage the pull forces. The pull force can be strong enough to hold the light system in place, even when physically moving the material layer (e.g., while walking, running, hiking, jumping). When grabbing the light module 200 and/or back plate 300 the light system can be moved and repositioned on the material layer without disengaging the pull force.

In one embodiment, the light module 200 and be powered on by pressing the power switch 211. Pressing the power switch repeatedly can cycle through multiple modes.

Figure 9A:
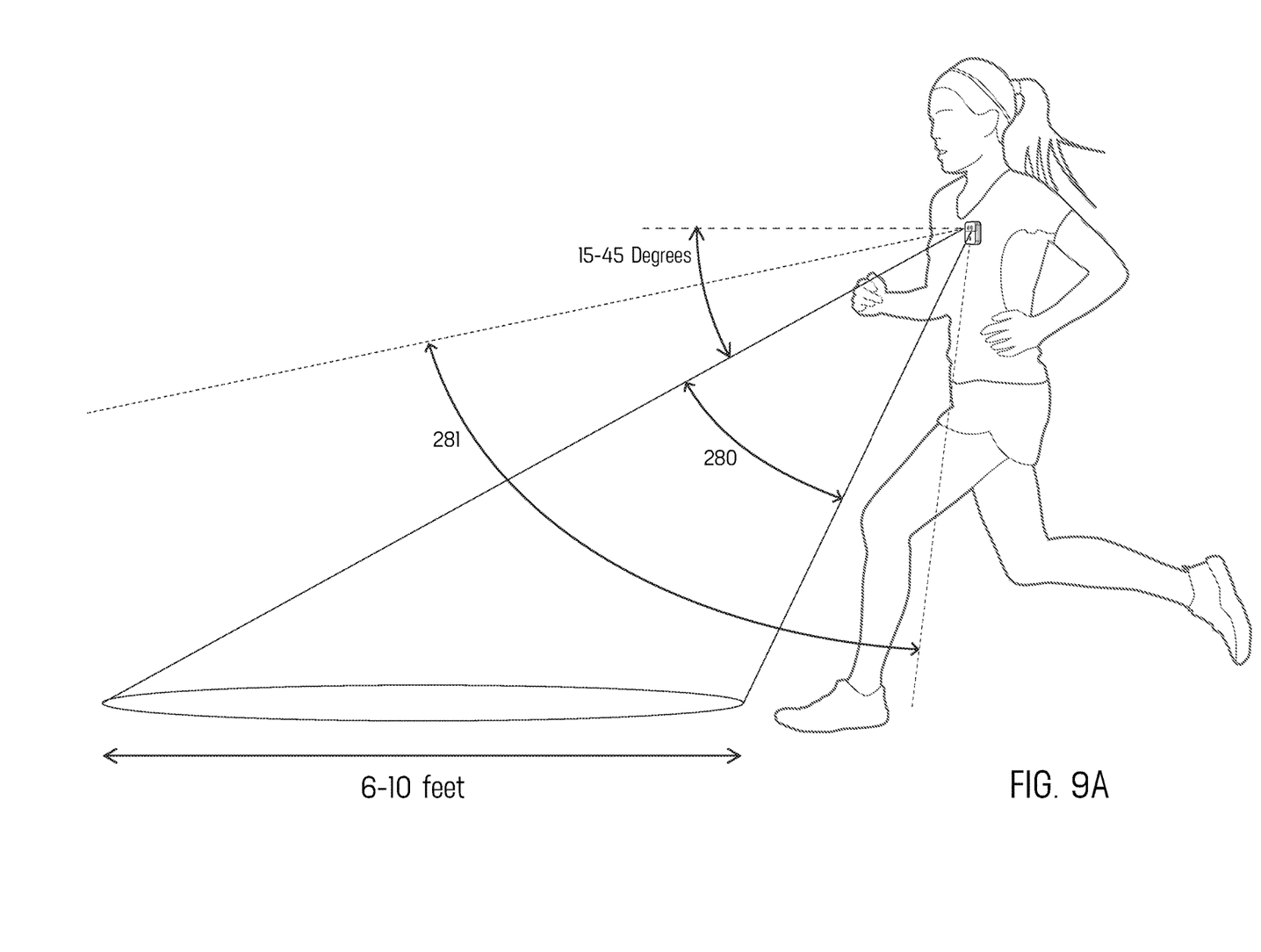
FIG. 9A is a schematic view of the illumination areas covered by the task light and the ambient light

FIG. 9A shows one embodiment, where the light emitted is projected downward at an angle of between about 15-45 degrees. However, the emitted light can be projected at other suitable angles. There can be two light types emitted when the LED light system is powered on: A higher intensity light beam, task light 280; and a lower intensity but wider spread, ambient light 281.

In one embodiment, pressing repeatedly on the power button will cycle through the following modes:
1. Both task light 280 and ambient light 281
2. Only task light 280 is on
3. Task light 280 is blinking perceivably to the human eye
4. Unit is off.

FIG. 9A also shows how the light system can be used in a physical activity such as running.

Figure 9B:
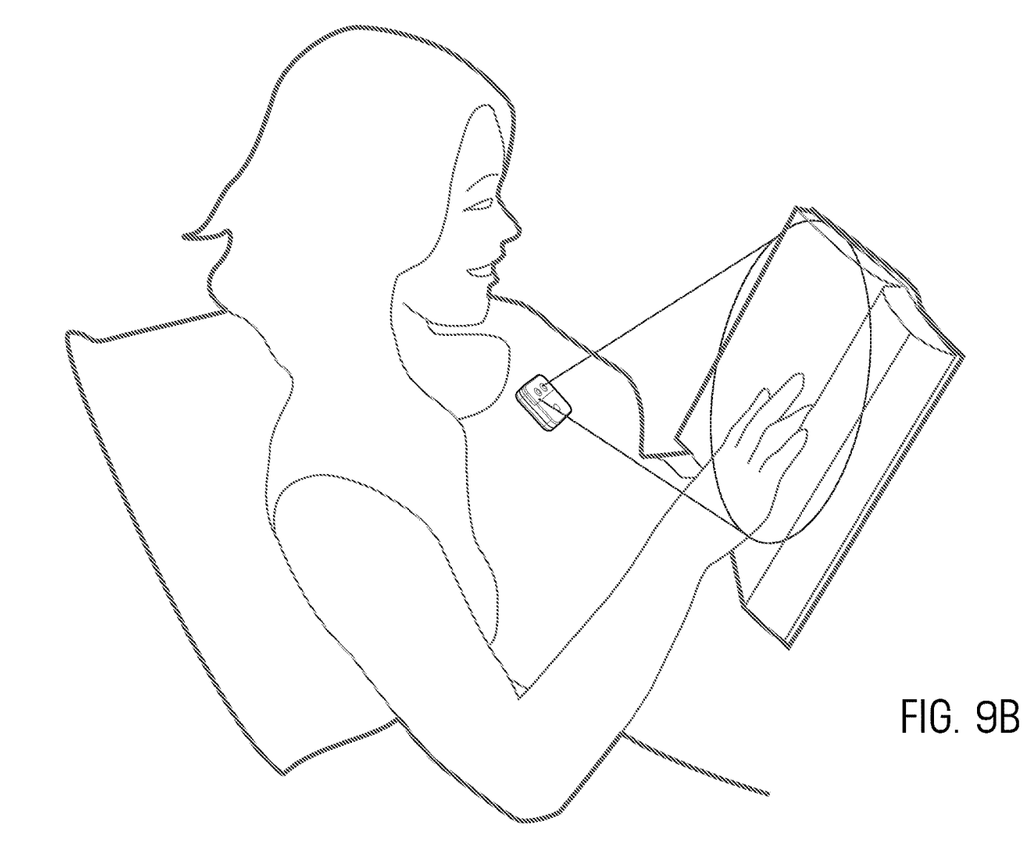
FIG. 9B is a schematic view of the use of the light module in a closer range task.

FIG. 9B shows how the projection angle of the light can also work for illumination of detailed tasks closer to the person's body.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A light system for hands-free illumination, comprising:
   a light module comprising
   one or more light emitting diodes (LEDs),
   a USB connector interface configured to removably connect with a power source to provide power the one or more LEDs, and
   one or more magnetic elements or magnetically responsive modules configured to removably couple the lighting module to a ferrous material.

2. The light system of claim 1 further comprising a backing plate comprising one or more magnetic elements or magnetically responsive modules, the backing plate being removably coupleable to the light module via a magnetic force.

3. The light system of claim 2 wherein the light module and backing plate are configured to be disposed on either side of one or more layers of material such that the light module and backing plate magnetically couple to each other with the one or more layers of material interposed between the light module and the backing plate.

4. The light system of claim 3 wherein the one or more layers of material are one or more clothing layers.

5. The light system of claim 1 wherein the light module further comprises one or more rechargeable batteries configured to provide power to the one or more LEDs, the one or more rechargeable batteries configured to be recharged via the power source.

6. The light system of claim 1 wherein the light module is water resistant.

7. The light system of claim 1 further comprising a printed circuit board configured to control the operation of the one or more LEDs.

8. The light system of claim 1 wherein the light module comprises a power switch mechanically actuatable by a user to turn the one or more LEDs on and off.

9. The light system of claim 1 wherein the light emitted by the one or more LEDs is projected downward at an angle of about 15-45 degrees from horizontal.

10. The light system of claim 1 wherein the one or more LEDs are operable to provide one or both of:
    a relatively lower intensity, but relatively wider dispersed ambient light to illuminate a relatively wider range of the environment, and
    a relatively higher intensity, but relatively narrower focused task light to illuminate an area about 6-10 feet in front of the user.

11. The light system of claim 1 wherein the one or more LEDs are configured to be cycled between one or more states chosen from the group consisting of: off, constant light, flashing light, ambient light only, ambient light and task light, and task light only.

12. A light system for hands-free illumination, comprising:
    a light module comprising
    one or more lighting elements,
    an interface connector configured to removably connect with a power source to provide power the one or more lighting elements, and
    one or more magnetic elements or magnetically responsive modules configured to removably couple the lighting module to a ferrous material; and
    a backing plate configured to removably and magnetically couple to the light module, the backing plate comprising one or more magnetic elements or magnetically responsive modules.

13. The light system of claim 12 wherein the light module and backing plate are configured to be disposed on either side of one or more layers of material such that the light module and backing plate magnetically couple to each other with the one or more layers of material interposed between the light module and the backing plate.

14. The light system of claim 13 wherein the one or more layers of material are one or more clothing layers.

15. The light system of claim 12 wherein the one or more lighting elements are one or more light emitting diodes (LEDs).

16. The light system of claim 12 wherein the light module further comprises one or more rechargeable batteries configured to provide power to the one or more lighting elements, the one or more rechargeable batteries configured to be recharged via the power source.

17. The light system of claim 12 wherein the interface connector is a USB connector.

18. The light system of claim 12 further comprising a printed circuit board configured to control the operation of the one or more lighting elements.

19. The light system of claim 12 wherein the light emitted by the one or more lighting elements is projected downward at an angle of about 15-45 degrees from horizontal.

20. The light system of claim 12 wherein the one or more lighting elements are operable to provide one or both of:
    a relatively lower intensity, but relatively wider dispersed ambient light to illuminate a relatively wider range of the environment, and
    a relatively higher intensity, but relatively narrower focused task light to illuminate an area about 6-10 feet in front of the user.

\* \* \* \* \*

UNITED STATES PATENT AND TRADEMARK OFFICE
CERTIFICATE OF CORRECTION

PATENT NO. : 9,732,948 B1  
APPLICATION NO. : 15/243733  
DATED : August 15, 2017  
INVENTOR(S) : David Malina Page 1 of 1

It is certified that error appears in the above-identified patent and that said Letters Patent is hereby corrected as shown below:

In the Specification

In Column 3 at Line 61, Change "an" to --as--.

In Column 4 at Line 5 (approx.), Change "and or" to --and/or--.

In the Claims

In Column 7 at Line 14, In Claim 1, change "power the" to --power to the--.

In Column 8 at Line 12 (approx.), In Claim 12, change "power the" to --power to the--.

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*